United States Patent
Sharma et al.

(10) Patent No.: US 7,886,238 B1
(45) Date of Patent: Feb. 8, 2011

(54) VISUAL YIELD ANALYSIS OF INTERGRATED CIRCUIT LAYOUTS

(75) Inventors: Harsh Dev Sharma, San Jose, CA (US); Rajeev Srivastava, San Jose, CA (US); Srinivas R. Kommoori, Milpitas, CA (US); Bharat Bhushan, Santa Clara, CA (US); Mithunjoy Parui, Mountain View, CA (US); Albert Lee, Livermore, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 318 days.

(21) Appl. No.: 11/564,223

(22) Filed: Nov. 28, 2006

(51) Int. Cl.
*G06F 17/50* (2006.01)

(52) U.S. Cl. ............ 716/2; 716/4; 716/5; 716/11; 716/19

(58) Field of Classification Search ............ 716/2, 716/19–21, 4, 5, 11; 430/5, 30
See application file for complete search history.

(56) References Cited

U.S. PATENT DOCUMENTS

| | | | |
|---|---|---|---|
| 6,070,004 A * | 5/2000 | Prein | 716/10 |
| 6,317,859 B1 * | 11/2001 | Papadopoulou | 716/4 |
| 6,393,602 B1 * | 5/2002 | Atchison et al. | 716/4 |
| 7,174,521 B2 * | 2/2007 | Stine et al. | 716/4 |
| 2002/0164065 A1 * | 11/2002 | Cai et al. | 382/149 |
| 2005/0132306 A1 * | 6/2005 | Smith et al. | 716/1 |
| 2005/0190957 A1 * | 9/2005 | Cai et al. | 382/141 |

OTHER PUBLICATIONS

"Yield Prediction by Sampling IC Layout" by Gerard A. Allan, IEEE Transaction on Computer-Aided Design of Integrated Circuits and System, vol. 19, No. 3, Mar. 2000.*
"Targeted Layout Modifications for Semiconductor Yield/Reliability Enhancement" by Gerard A. Allan, IEEE Transactions on Semiconductor Manufacturing, vol. 17, No. 4, Nov. 2004.*
Yield Prediction by Sampling IC Layout by Gerrard A. Allan, IEEE Transaction on Computer-Aided Design of Integrated Circuits and System, vol. 19, No. 3, Mar. 2000) in view of PEYE-CAA ("PEYE-CAA—Critical Area Analysis",http://web.archive.org/web/20060618113829/http://icyield.com/peye_caa.html , Jun. 18, 2006.*
Calibre YielAnalyzer Datasheet by Mentor Graphics, http://web.archive.org/web/20061015213150/www.mentor.com/products/ic_nanometer_design/bl_phy_design/calibre_yieldanalyzer/upload/calibre_yieldanalyzer.pdf , Oct. 15, 2006.*

(Continued)

*Primary Examiner*—Paul Dinh
*Assistant Examiner*—Nha T Nguyen
(74) *Attorney, Agent, or Firm*—Alford Law Group, Inc.; William E. Alford; Sang Dang

(57) ABSTRACT

Systems and methods to optimize a layout based on the yield analysis is disclosed. The method includes generating an integrated circuit layout having two or more layers of wire interconnect to form net segments and having one or more via contact layers to couple net segments in the wire interconnect together. The method further includes performing a yield analysis of the net segments in the integrated circuit layout and displaying the net segments with a visual depiction of the yield analysis using multiple levels of opacity to reflect yield scores of the net segments in the integrated circuit layout.

32 Claims, 14 Drawing Sheets

OTHER PUBLICATIONS

"An Interactive VLSI CAD Tool for Yield Estimation" by Israel A. Wagner & Israel Koren, IEEE, @ May 1995.*

"Simulation Standard—Real-time DRC in Expert Layout Editor", A Journal for CAD/CAE Engineer, vol. 9, No. 9, Sep. 1998.*

Visual Numerics, Inc. Yield Analysis in the Semiconductor Industry. Analysis Challenges in the Semiconductor Industry and How the PV-WAVE Family of Products Delivers Solutions. May 2002. pp. 1-5. Visual Numerics, Inc. San Ramon, CA, US.

L. Scheffer, L. Lavagno, G. Martin. EDA for IC Implementation, Circuit Design, and Process Technology. 2006. pp. 19:1-20:14. Taylor and Francis Group, LLC. Boca Raton, FL, US.

T. Ohtsuki, S.W. Director, and W. Maly. Advances in CAD for VLSI vol. 8; Statistical Approach to VLSI. Introduction to Design for Manufacturability of VLSI Circuits, by W. Maly. Statistical Simulation of Modern Industrial Fabrication Process, by P.K. Mozumder, et al. Elsevier Science B.V. pp. 3-100 and 331-339. Amsterdam, The Netherlands, 1994.

* cited by examiner

VISUAL YIELD ANALYSIS OF INTERGRATED CIRCUIT LAYOUTS

FIELD OF THE INVENTION

The embodiments of the invention generally relate to electronic design automation for integrated circuits and, more particularly, to a system and method to optimize the layouts of integrated circuit designs based on a visualization of yield analysis.

BACKGROUND

Integrated circuit (IC) designers often use electronic design automation (EDA) software tools to assist in the design process, and to allow simulation of a chip design prior to prototyping or production. IC design using EDA software tools generally involves an iterative process whereby the IC design is gradually perfected. Typically, the IC designer builds up a circuit by inputting information at a computer workstation generally having high quality graphics capability so as to display portions of the circuit design as needed. A top-down design methodology is commonly employed using a hardware description languages (HDL), such as Verilog or VHDL, for example, by which the designer creates an integrated circuit by hierarchically defining functional components of the integrated circuit, and then decomposing each component into smaller and smaller components to eventually produce a layout of the chip.

A number of design choices that generate the layout of an integrated circuit chip may affect the manufacturing yield of the integrated circuit in its monolithic semiconductor substrate. It would be advantageous to provide an EDA software tool that could generate a dynamic visualization of a real-time yield analysis of the layout of an integrated circuit chip to assist designers to visualize the yield impact and perhaps to make design choices that would improve the yield of an integrated circuit.

DETAILED DESCRIPTION

In the following detailed description of the embodiments of the invention, numerous specific details are set forth in order to provide a thorough understanding of the embodiments of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

The embodiments of the invention include a method, apparatus and system for visual yield analysis of integrated circuit layouts.

Figure 1:
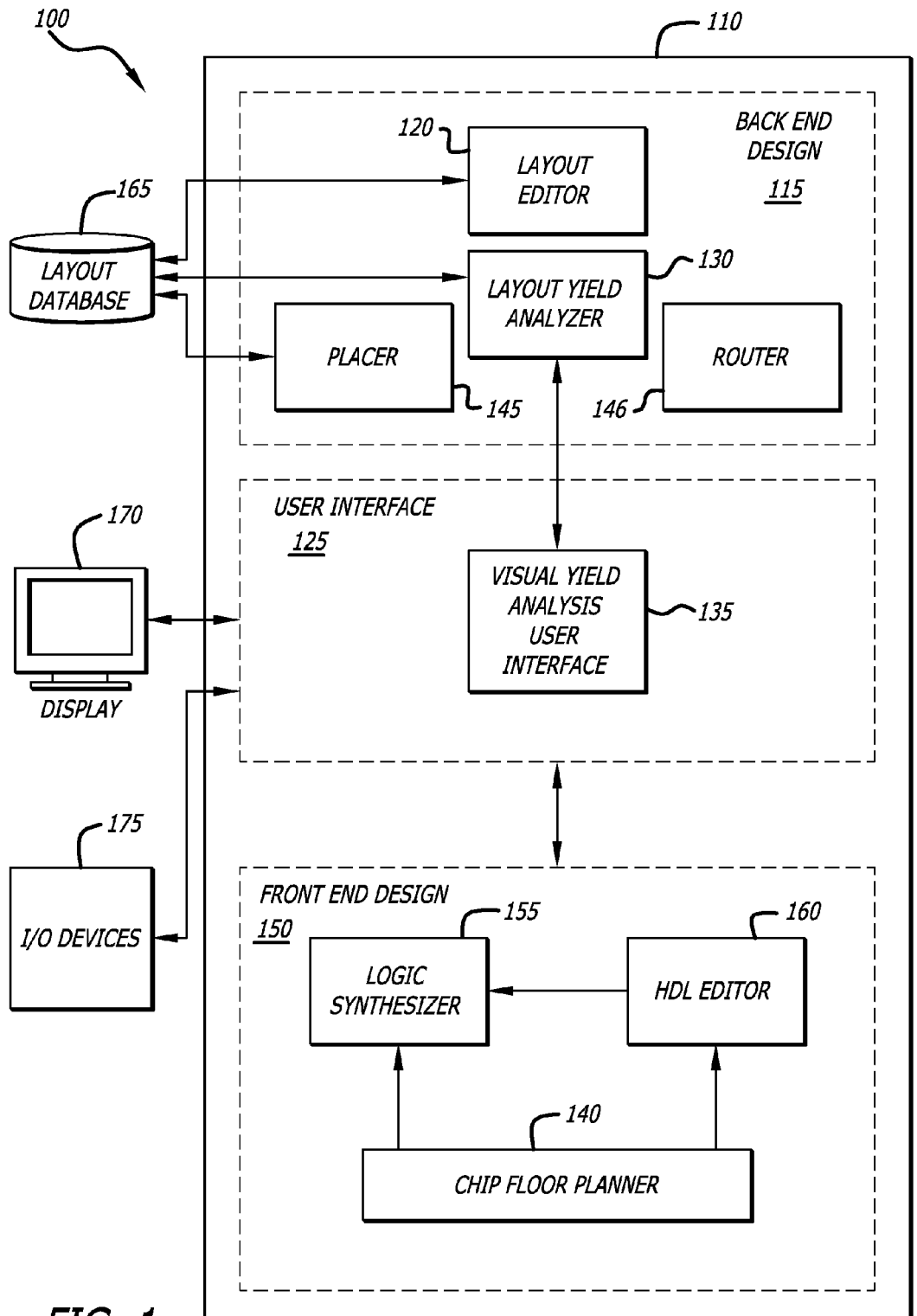
FIG. 1 is a diagram of an EDA system in accordance with one embodiment of the invention.

FIG. 1 is a diagram of an EDA system 100 that may be used in connection with various embodiments of the invention as described herein. As shown in FIG. 1, the EDA system 100 includes a computer 110 connected to a layout database 165, and a display 170 and various input-output (I/O) devices 175. The computer 110 may comprise one or more processors (not shown in FIG. 1, see processor 1210 in FIG. 12), as well as working memory (e.g., random access memory not shown in FIG. 1, see memory 1220 in FIG. 12) in an amount sufficient to satisfy the speed and processing requirements of the system.

The computer 110 may execute stored program code for the front end or logical design 150 of an integrated circuit and the back end or physical design 115 of the integrated circuit. The software tools that may be executed by the computer 110 to perform physical design include a placer 145, a router 146, a layout editor 120, and evaluation tools. The evaluation tools, in one embodiment of the invention, include a layout yield analyzer 130. The computer 110 may further execute one or more user interfaces 125 including a visual yield analysis user interface 135 to display the yield result (or yield score) from the layout yield analyzer 130.

The layout editor 120 provides for the creation of layouts at a polygon level in a graphics database. The placer 145 and router 146 perform placement of cells and routing of the nets at a global level as well at a detail level in accordance with a netlist that describes the integrated circuit design. The layout yield analyzer 130 can interactively evaluate a layout as its generated by the placer and router tools or the layout editor 120. Alternatively, the layout yield analyzer 130 can evaluate the layout after it has been completely generated by one or more software tools.

To generate a netlist, the computer may execute front end or logical design tools 150, which may include a chip floor planner 140, a logic synthesizer 155, and an HDL editor 160. As discussed previously, a netlist may be used by one or more software tools to generate the physical layout of the integrated circuit design.

The computer 110 is preferably coupled to a mass storage device (e.g., magnetic disk or cartridge storage) providing a layout database 165 with which a number of the foregoing system components interface. In one embodiment, the layout database 165 may be implemented using the EDIF (Electronic Design Interchange Format) database standard. The computer 110 may also comprise or be connected to mass storage containing one or more component libraries (not shown) specifying features of electrical components available for use in circuit designs.

The netlist, a schema of the layout database 165 of an integrated circuit, is comprised of a plurality of instances of transistors, gates, cells, blocks, modules, and other levels of circuit hieararchy and a plurality of nets. A net interconnects a number of instances, by associating pins on each of the instances or, more generally, by associating the inputs and outputs of a number of instances. The netlist is converted into the pluralilty of mask layers in the layout database 165 to physically manufacture the integrated circuit in a wafer fabrication facility.

Figure 2:
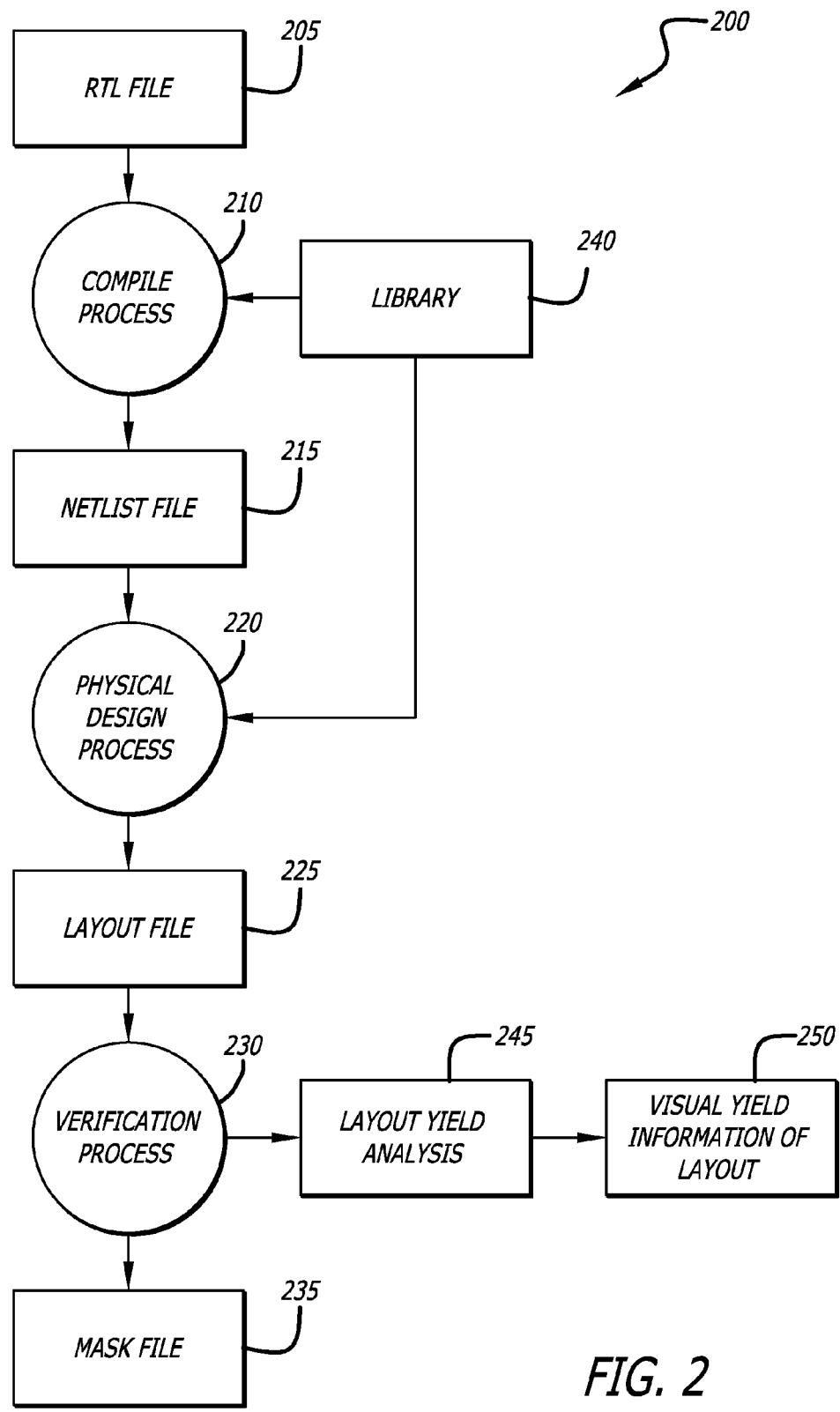
FIG. 2 is a diagram of a general process flow for a circuit design, illustrating various levels of circuit abstraction and including a post-routed yield analysis in accordance with one embodiment of the invention.

FIG. 2 is a diagram 200 of a general process flow for a circuit design, illustrating some of the various levels of circuit abstraction as described above. As illustrated in FIG. 2, a register transfer logic (RTL) file 205 in the form of an HDL file or other high level functional description undergoes a compile process 210, which typically includes some form of logic synthesis, and converts the functional description of the circuit into a specific circuit implementation which may be stored in the form of a netlist file 215. As part of the compile process 210, a component and device library 240 is generally referenced, which stores information concerning what types of design components and devices are available, and the characteristics of those design components and devices which are needed in order to determine their functional connectivity. At low level in the hierarchy of the integrated circuit, the netlist file 215, as previously noted, may identify specific devices from a device level library, and describes the specific device-to-device connectivity. In the physical design process 220, the devices of the netlist file 215 are instantiated, layout modules are generated, and these modules are then placed and routed, resulting in a layout file 225. The device library 240 is utilized in this process stage in order to obtain information concerning the sizes of the devices and other components that may be present in the netlist file 215.

After the layout file 225 is generated, verification processes 230 may be run on the layout file 225, including a layout yield analysis 245. The layout of the layout file 225 can be displayed with visual yield information 250 in response to the yield result (or yield score) obtained from the layout yield analysis 245.

After the layout passes verification it can be patterned into a mask file 235. The mask file 235 may be provided to a mask manufacture or to a silicon foundry. The mask file 235 includes sufficient information to allow a foundry to manufacture an integrated circuit onto a monolithic semiconductor substrate.

Figure 3:
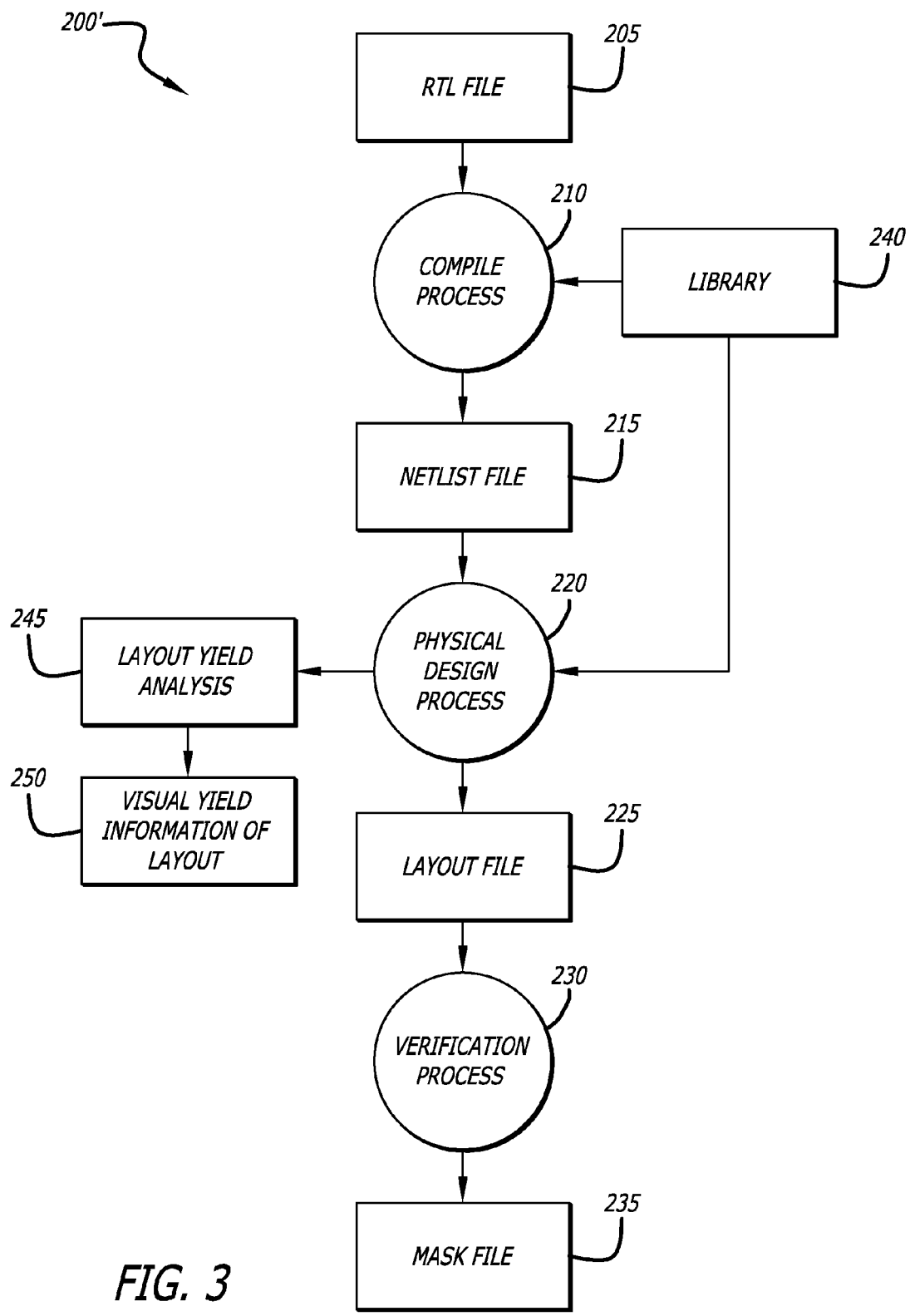
FIG. 3 is a diagram of a general process flow for a circuit design, illustrating various levels of circuit abstraction and including an interactive yield analysis in accordance with one embodiment of the invention.

Alternatively, as illustrated in FIG. 3, layout yield analysis 231 may be interactively performed during the physical design process 220 and the layout can be displayed as it is being generated with the visual yield information. That is, the layout yield analysis 231 may occur earlier in the design flow 200' of the integrated circuit.

In one embodiment of the invention, a yield analysis tool is used to provide a dynamic visualization of a real-time yield analysis of the layout to assist designers to visualize the yield impact of the routing. Designers can visualize the yield impact of routing based on a few simple factors such as wire spacing, wire width, wire length, congestion, number of cuts in vias, and the size of vias, all of which may play a role in determining the yield score of the layout. The display mechanism can be an overlay of different shades (or opacity) of the layer color to display the severity of the impact. In addition, the display mechanism can be applied to reflect simultaneous critical area analysis (CAA) instead of or in addition to the simple factors. In integrated circuit design, a critical area refers to the area of a circuit design wherein a particle of a particular size can cause a random failure. The critical area analysis is a statistical analysis and generally measures the sensitivity of the circuit to a reduction in yield. Furthermore, in one embodiment, the display mechanism can be in the form of nets and/or vias in different shapes, shades and/or patterns to reflect DFM (Design for Manufacturability) yield factors.

Figure 4:
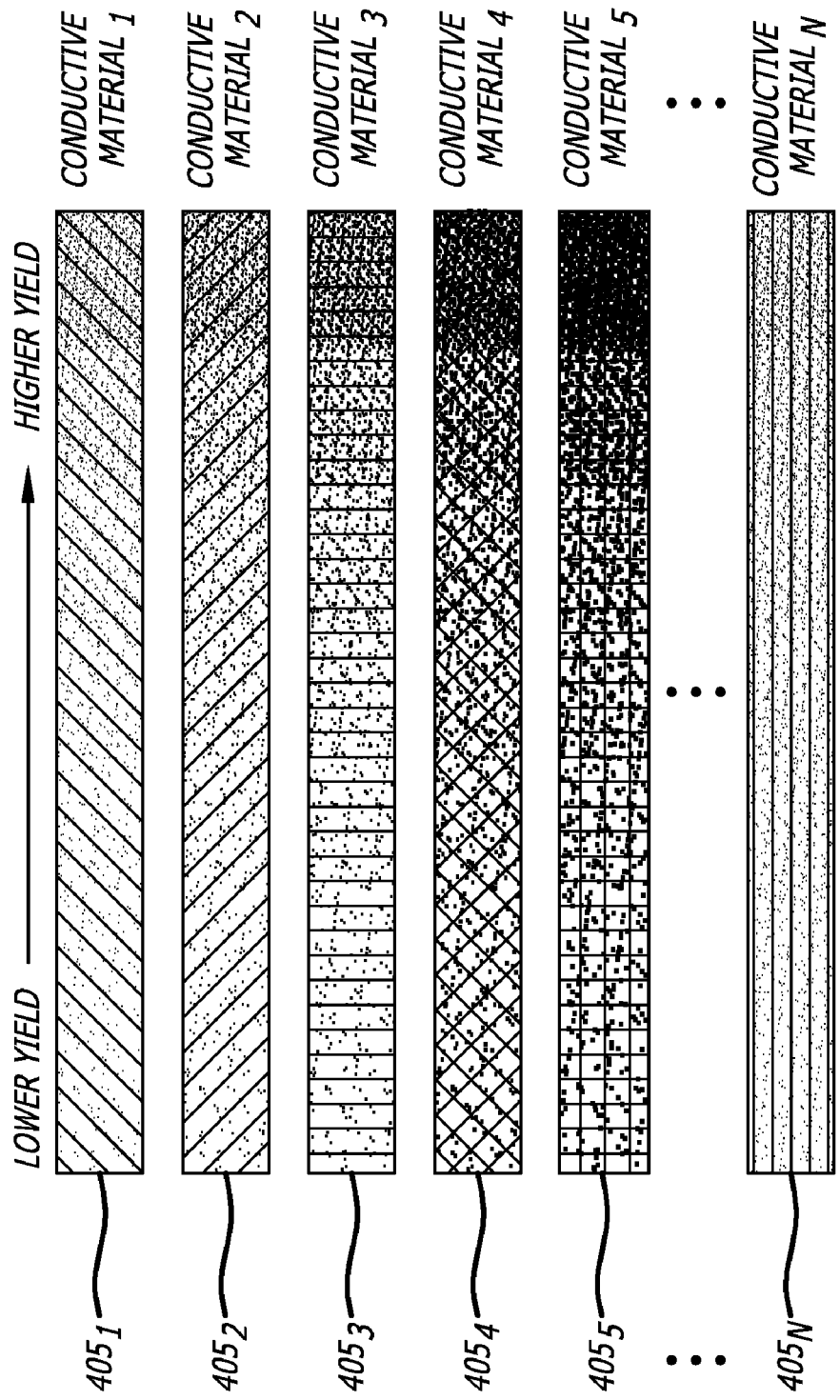
FIG. 4 illustrates examples of a yield scale having different shades in accordance with one embodiment of the invention.

In one embodiment, the yield analysis tool uses a yield scale with different shades to implement the visualization. FIG. 4 illustrates examples of a yield scale 400 having different shades in accordance with one embodiment of the invention. As shown in FIG. 4, a lighter shade (or a shade with lower opacity) indicates a lower yield score, and a darker shade (or a shade with higher opacity) indicates a higher yield score. However, such shading schema could easily be reversed in other embodiments, such that a darker shade (or a shade with higher opacity) would indicate a lower yield score, and a lighter shade (or a shade with lower opacity) would indicate a higher yield score. As further shown in FIG. 4, a different color $405_1$, $405_2$, $405_3$ ... $405_N$ could be used, in one embodiment, to depict a different layer of material, such as the different layers of conductive material (Conductive Materials through Conductive Material$_N$) that may used to comprise a net segment. For example, in FIG. 4, blue (color $405_4$), red (color $405_2$), green (color $405_3$), yellow (color $405_4$), burgundy (color $405_5$), and purple (color $405_N$) could be used to depict Conductive Material$_1$, Conductive Material$_2$, Conductive Material$_3$, Conductive Material$_4$, Conductive Material$_5$, and Conductive Material$_N$ respectively. In one embodiment, each conductive material layer could be a metal alloy layer. Alternatively, each conductive material could be polysilicon, diffusion, and other contact layers in other embodiments of the invention.

Figure 5A:
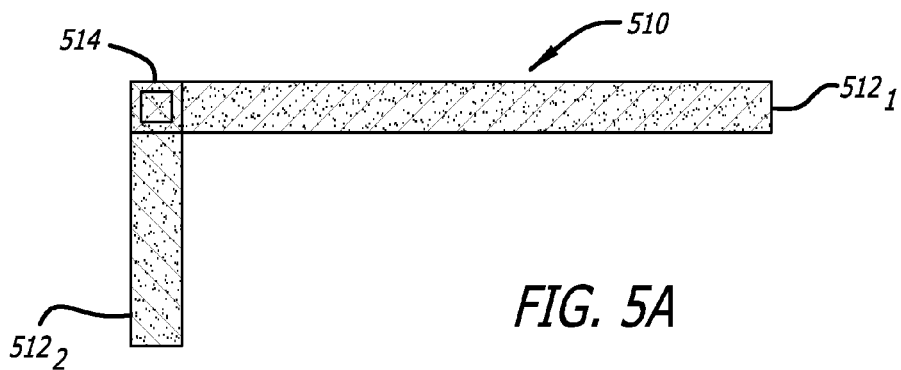
FIG. 5A shows a yield analysis of an isolated net segment having a single cut via in accordance with one embodiment of the invention.

In one embodiment of the invention, the yield analysis tool displays the visualization of the yield analysis per net segment and/or per via based on certain factors including, but are not limited to, spacing, width, length, and/or congestion. FIG. 5A shows a yield analysis of an isolated net segment 510 having a single cut via 514 in accordance with one embodiment of the invention. As shown in the figure, the net segment includes two intersecting wires $512_1$ and $512_2$ of different metal layers, and a single cut via 514 to connect the wires $512_4$ and $512_2$ together. The isolation of net segment 510 without any other components in the segment's surrounding vicinity would result in a higher yield. However, since there is only one single cut via 514 in the net segment 510, the segment 510 would have a lower yield score. Therefore, the net segment 510 has a medium yield score, as illustrated in the figure by a selected medium shade (or a shade with medium opacity).

Figure 5B:
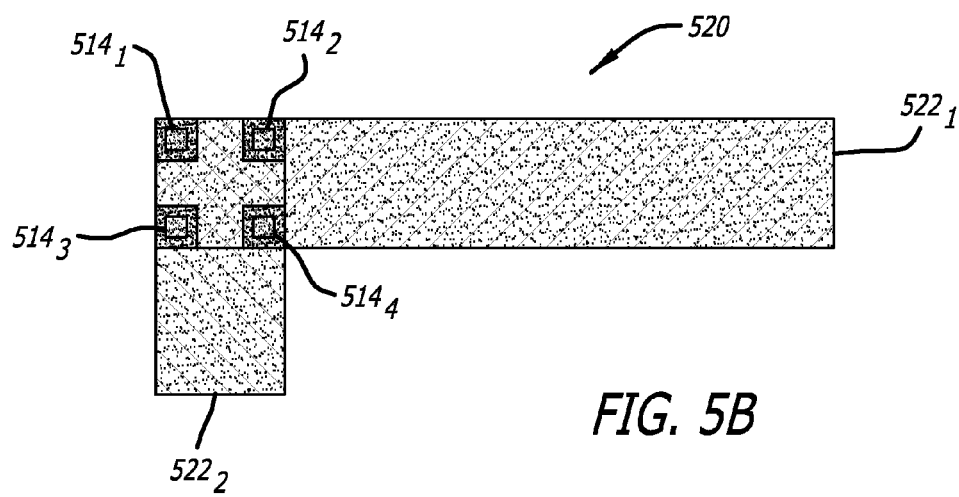
FIG. 5B shows a yield analysis of an isolated net segment having wide wires as well as multi-cut vias in accordance with one embodiment of the invention.

In contrast, FIG. 5B shows a yield analysis of an isolated net segment 520 having wide wires $522_1$ and $522_2$ on different metal layers as well as multi-cut vias $514_1$, $514_2$, $514_3$, and $514_4$ in accordance with one embodiment of the invention. As shown in the figure, the net segment includes two intersecting wide wires $522_1$ and $522_2$ of different metal types, and multi-cut vias $514_1$, $514_2$, $514_3$, and $514_4$ to connect the wires together $522_1$ and $522_2$. The wide wires $522_1$ and $522_2$ and the multi-cut vias $514_1$, $514_2$, $514_3$, and $514_4$ increase the yield score. FIG. 5B shows that the net segment has a relatively higher yield score, as vias $514_1$, $514_2$, $514_3$, and $514_4$ and wires $522_1$ and $522_2$ are shown in the figure using a darker shade (or a shade with higher opacity).

Figure 5C:
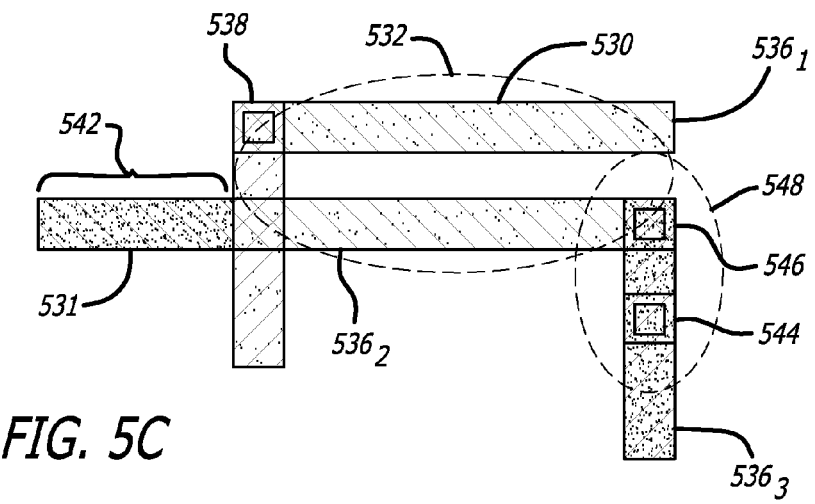
FIG. 5C shows a yield analysis of a net segment with wires routed closely together in accordance with one embodiment of the invention.

FIG. 5C shows a yield analysis of a pair of net segments 530 and 531 with wires routed closely together in accordance with one embodiment of the invention. As shown in the figure, components in a congested area 532 have a lower yield because wires $536_1$ and $536_2$ are placed closely together. As a result, via 538, wire $536_1$, and wire $536_2$ in the congested area 532 have a lower yield score and are illustrated in the figure using a lighter shade. Furthermore, segment 542 of wire $536_1$, which resides outside of the congested area and would therefore have a higher yield score, is illustrated in the figure using a darker shade than the shade used to illustrate wire $536_1$, which resides within the congested area and would therefore have a lower yield score. In addition, wire $536_3$ and vias 544 and 546 have a higher yield score (as illustrated with a darker shade) because they reside mostly outside of the congested area 532. Furthermore, wire $536_3$ and vias 544 and 546 reside inside an area 548 with the double cut vias 544 and 546 connecting wire $536_3$ to wire $536_2$ which would increase the yield score.

Figure 6A:
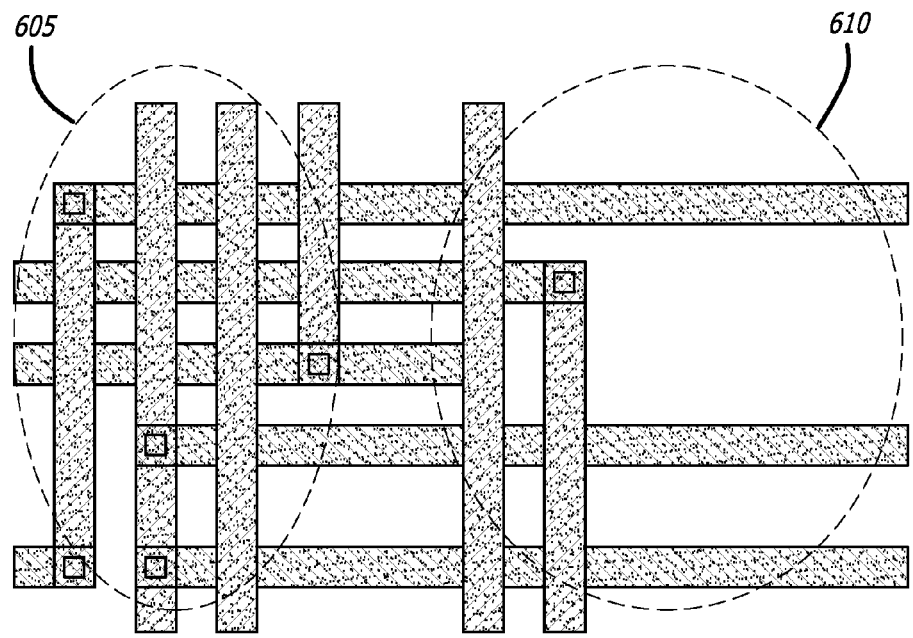
FIG. 6A and FIG. 6B illustrate contrasting samples screenshots of the visualization of yield analysis without and with the inventive yield analysis tool respectively in accordance with one embodiment of the invention.
Figure 6B:
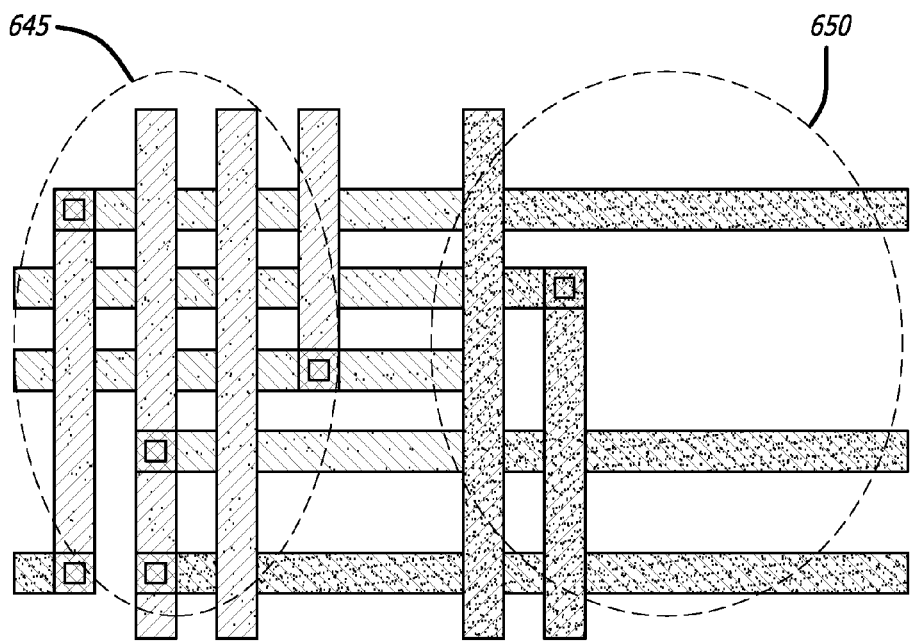

Referring now to FIG. 6A and FIG. 6B, contrasting sample screenshots of an exemplary layout are illustrated. FIG. 6A illustrates an exemplary layout that may be received the inventive yield analysis tool. As shown FIG. 6A, there is no visual difference between the net segments in the congested areas 605 and the net segments in the non-congested area 610 that would indicate any different in manufacturing yield.

In contrast, FIG. 6B illustrates a screen shot visualization of yield analysis of the net segment using the inventive yield analysis tool. As shown in figure, the net segments and vias congested area 645 are illustrated with a lighter shade (or lower opacity) to depict their lower yield score due to factors such as wires being placed closely together. In contrast, the net segments and vias in the non-congested area 650 are illustrated with a darker shade (or higher opacity) to depict their higher yield score. Given such visualization of the yield analysis, the designer can make intelligent decisions in routing based on the awareness of yield analysis. For example, if the designer is aware of yield impact during routing, the designer could modify the design by spacing out the routing or by changing topology of routing to improve the yield score.

Figure 6C:
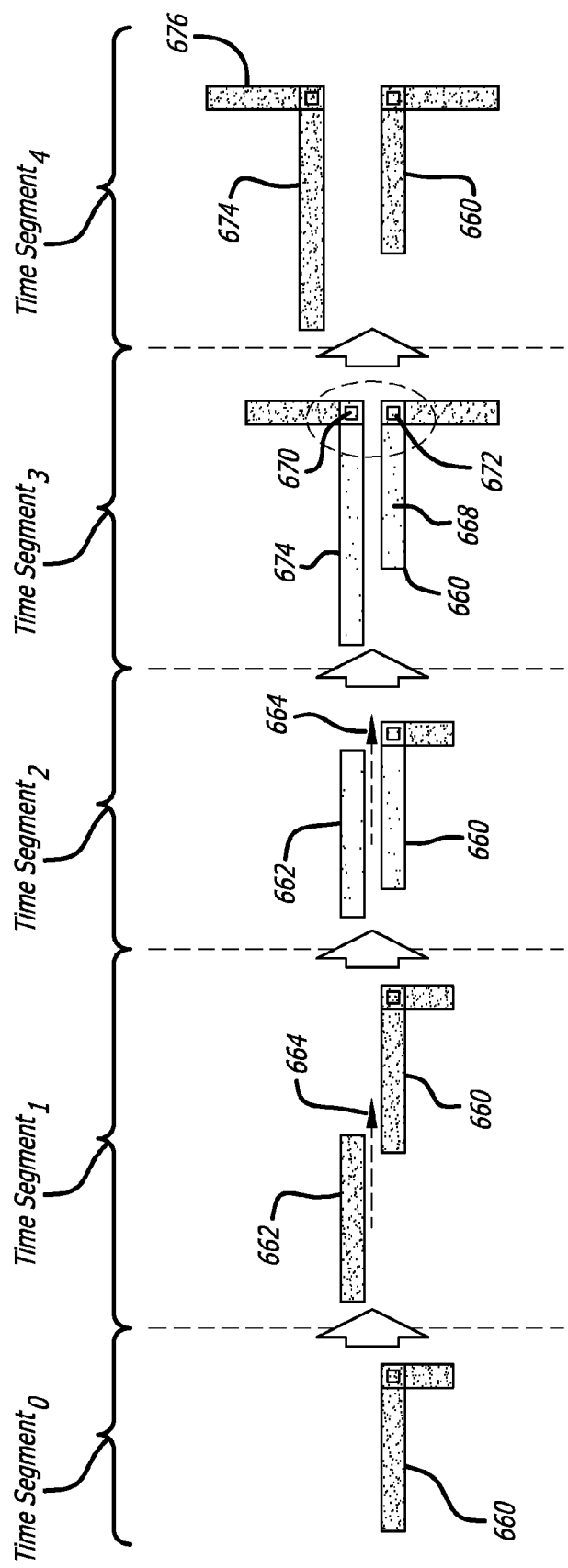
FIG. 6C illustrates an example where the yield analysis tool is applied in an interactive routing session to improve the yield in accordance with one embodiment of the invention.

In one embodiment, the yield analysis tool can be applied on an interactive routing basis as well as on a post-routing basis. FIG. 6C illustrates an example where the yield analysis tool is applied in an interactive routing session to improve the yield in accordance with one embodiment of the invention. As shown in the figure, the designer starts with one net segment 660 at time $segment_0$. The designer adds wire 662 for the second net segment in time $segment_1$. During time $segment_1$, time $segment_2$, and time $segment_3$, the designer continually moves the position of wire 662 from left to right (as indicated by directional arrows 664). As wire 662 of the second net segment is moved into a position that is parallel to and within the minimum spacing of wire 668 of first net segment 660, wire 662 and wire 668 change to a lighter shade (i.e., lower opacity) to reflect the decrease in the yield score of the net segments due to congestion. Also, in time $segment_3$, via 670 of second net segment 674 is dropped within an area adjacent to via 672 of first net segment 660, causing the shade of both vias 670 and 674 to turn lighter (i.e., lower opacity) to reflect the decrease in yield score due to congestion. In time $segment_4$, net segments 660 and 674 are moved further apart in the vertical direction to reduce congestion and to improve the yield score. As a result, the shades of net segments 660 and 674 gradually turn darker (i.e., higher opacity) to reflect the improved yield score. In one embodiment, the designer (or user) could specify an auto-update distance threshold for automatic updates of the yield score. The auto-update distance threshold is generally the measurement of distance between a wire and another wire or other object for which the yield analysis is updated due to a movement of one or both of the wires or the other object, such as a via. For example, if the designer (or user) sets the auto-update distance threshold to be 6 µm in one embodiment, the shade (or opacity) of the net segments would be updated once every 6 µm. Of course, the designer could set the auto-update distance threshold to any reasonable value. Moreover, the auto-update distance threshold may be a function of the magnification under which the layout is to be viewed. For example, at a 200 times magnification, the auto-update distance threshold may be 6 microns while at a 1000 times magnification the auto-update distance threshold may be 1 micron.

In cases where the designer selects and moves a group of wires together, the opacity (or shade) of the outer wires in the group of wires may change. However, the opacity of the inside wires in the group may stay the same or may change, but less than the opacity of the outer wires in the group. This is because the relationship of the inner wires of the group may stay relatively the same. For example consider time segment 4 in FIG. 6C, wires 674 and 676 are moved together in the vertical direction away from wire 660. The opacity of outside wire 674 is changed more than the opacity of inside wire 676.

Figure 7:
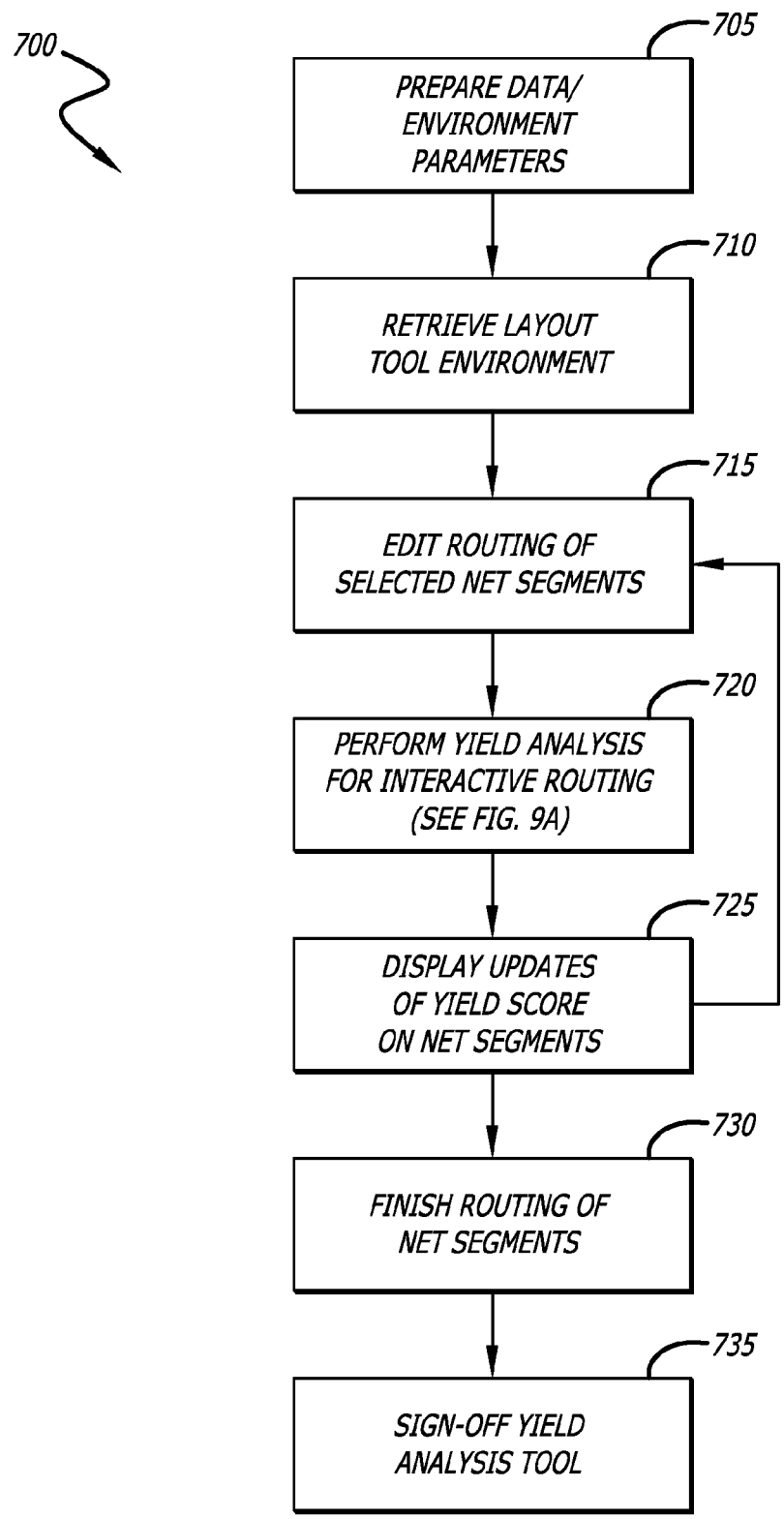
FIG. 7 is a flow chart describing the operation of the yield analysis tool during interactive routing in accordance with one embodiment of the invention.
Figure 9A:
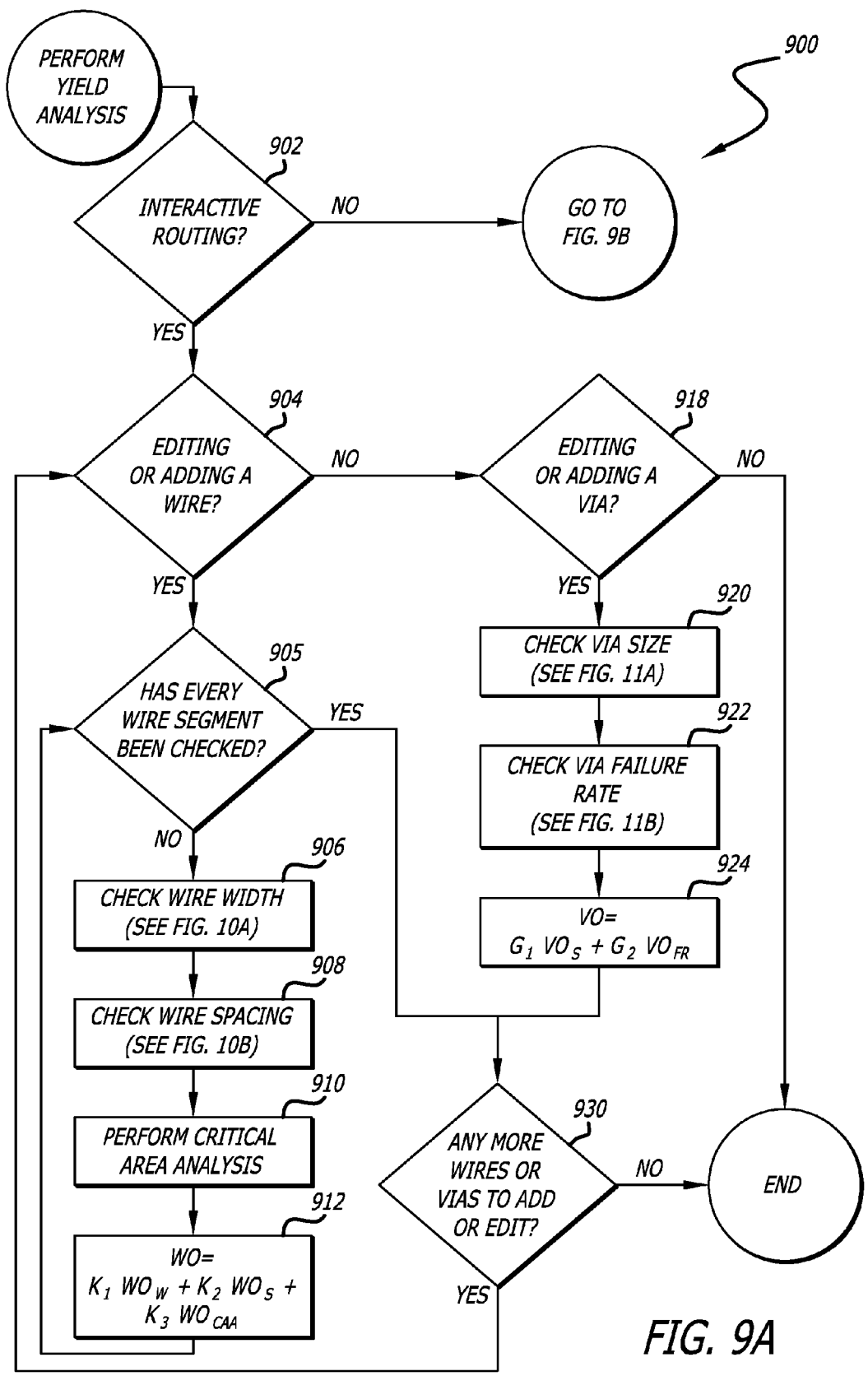
FIG. 9A is a flow chart describing the performance of yield analysis in accordance with one embodiment of the invention.

FIG. 7 is a flow chart 700 describing the application of the yield analysis tool during interactive routing in accordance with one embodiment of the invention. In block 705, certain data or environment parameters, such as color setting and yield score rule definitions, are prepared. Layout tool environment parameters are retrieved in block 710. The designer would add and/or edit the routing of a selected net segment in block 715. As the routed net segments are added and/or edited, the yield analysis tool is invoked to compute the yield score of the added and/or edited segment in real time in block 720. FIG. 9A is a flow chart 900, described further below, that illustrates the performance of yield analysis in accordance with one embodiment of the invention.

In FIG. 7, after the yield analysis is performed, the yield data updates are displayed (see block 725) such that the shade (or opacity) of components in the net segments change automatically and incrementally. In one embodiment, the designer (or user) could specify a predetermined threshold distance or length of a segment of wire on which yield analysis is to be performed, and yield score updates may be automatically and incrementally displayed. In addition, the designer (or user) could specify a predetermined radius around an affected wire on which yield analysis may be performed, and yield score updates may be automatically and incrementally displayed. Furthermore, for every change in size and/or location of a wire, the yield score of neighboring wires may also be updated. When the designer or user completes his or her edits, the routing of the net segments is allowed to finish in block 730. The sign-off process of the yield analysis performed by the yield analysis tool then occurs at block 735.

Referring now to FIG. 9A, a flow chart 900 is used to describe the performance of yield analysis in accordance with one embodiment of the invention. As shown in the figure, if yield analysis was invoked during an interactive routing session 902, a query (see block 904) is performed to determine whether a wire was added or edited to the net segment. If a wire has been added or edited, for each wire segment of a predetermined distance or length (see block 905) to check, wire opacity factors based on the wire width, the wire spacing, and the critical area analysis are computed in blocks 906, 908, and 910 respectively. In one embodiment, the designer (or user) could specify a predetermined threshold distance or length of the wire segment. In block 906 of FIG. 9A, procedure Check_Wire_Width is invoked to compute the wire opacity factor based on the wire width (denoted $WO_W$).

Figure 10A:
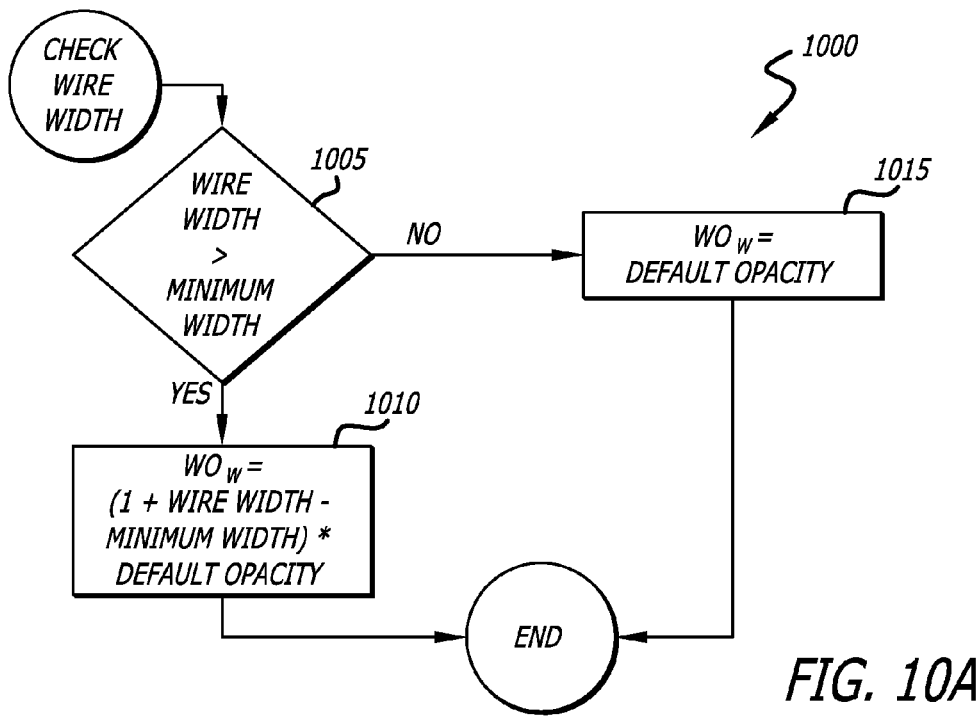
FIG. 10A is a flow chart describing the procedure Check_Wire_Width in accordance with one embodiment of the invention.

FIG. 10A is a flow chart 1000 describing the procedure Check_Wire_Width in accordance with one embodiment of the invention. As shown in the figure, if the wire width is less than or equal to the minimum width (see block 1005), $WO_W$ is assigned the default opacity value (see block 1015). If the wire width is greater than the minimum width, $WO_W$ is assigned an appropriate value to reflect that a wider wire would result in a higher yield score. In one embodiment, if the wire width is larger than the minimum width, $WO_W$ is assigned a value of the default opacity multiplied by the quantity of one plus the wire width less the minimum width (see block 1010).

Figure 10B:
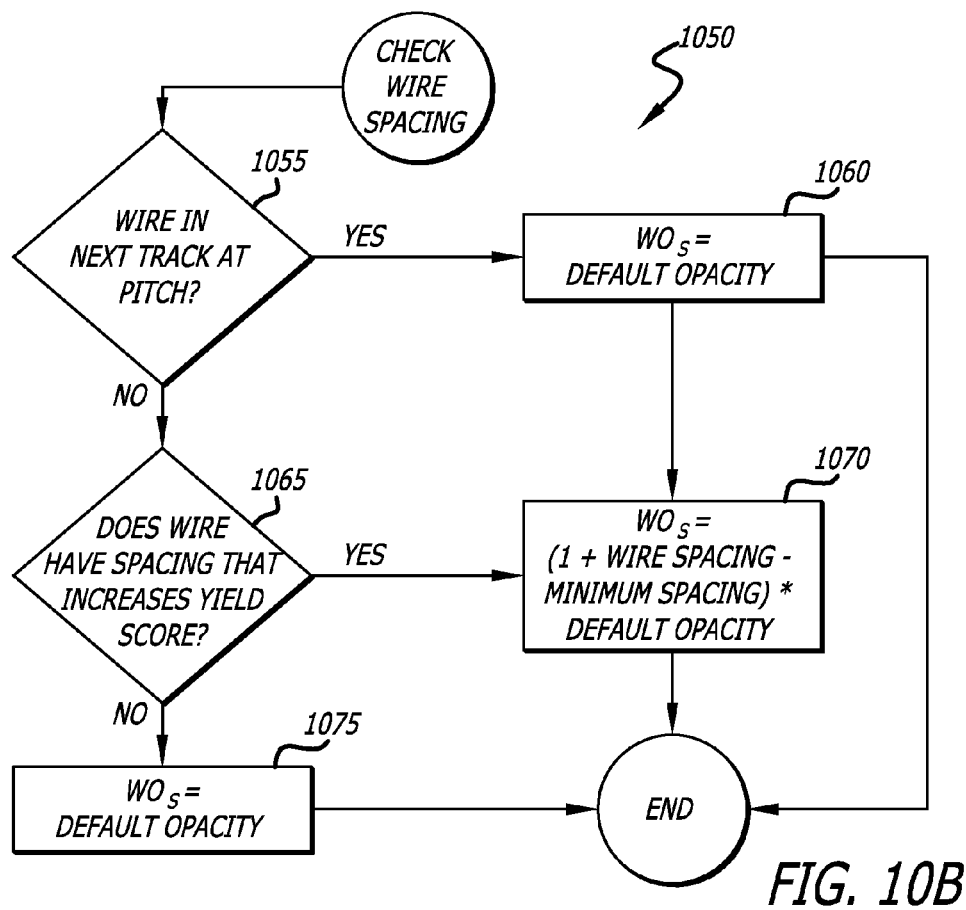
FIG. 10B is a flow chart describing the procedure Check_Wire_Spacing in accordance with one embodiment of the invention.

Returning to FIG. 9A, upon returning from procedure Check_Wire_Width (shown in FIG. 10A), the procedure Check_Wire_Spacing would be invoked (see block 908 of FIG. 9A) to compute the wire opacity factor based on wire spacing (denoted $WO_S$). FIG. 10B is a flow chart 1050 describing the procedure Check_Wire_Spacing in accordance with one embodiment of the invention.

Referring now to FIG. 10B, if the wire was placed in the next track at pitch at minimum spacing (see block 1055), $WO_S$ would be assigned the default opacity value (see block 1060), which is a programmable value in one embodiment. Otherwise if the wire was placed spaced apart from other wires with a spacing that would increase yield (see block 1065), $WO_S$ would be assigned a value to appropriately reflect that placement of the wire in a non-congested space would result in a higher yield score. Generally, a spacing that increases yield is one that is greater than the minimum spacing but less than a large spacing from another wire. In one embodiment, when the wire is placed with a spacing that increases the yield score, $WO_S$ would be assigned a value of default opacity multiplied by the quantity of one plus the spacing value less the minimum spacing value (see block 1070). If the added wire was neither placed in the next track at pitch nor placed at a spacing that would increase the yield, $WO_S$ may be assigned the default opacity value (see block 1075).

Referring now back to FIG. 9A, upon returning from procedure Check_Wire_Spacing (shown in FIG. 10B), a critical area analysis is performed and a wire opacity factor based on the critical area analysis (denoted $WO_{CAA}$) is computed (see block 910). In one embodiment, the critical area analysis is generally a statistical analysis of wire yield based on manufacturing parameters that may be supplied by the silicon vendor. In block 912, the overall wire opacity (denoted WO) of a wire or net segment is computed based generally on three wire opacity factors, including the wire opacity factor based on wire width ($WO_W$), the wire opacity factor based on wire spacing ($WO_S$), and the wire opacity factor based on the critical area analysis. As shown in block 912, each of these wire opacity factors is weighted, being multiplied by a constant $K_1$, $K_2$, and $K_3$ respectively, and the weighted opacity factors are then added to determine the overall wire opacity (WO).

After the wire has been checked for yield and its opacity level assigned, a determination is made at block 930 if there are any more wires or vias to add. If so, the process returns to block 904 to determine if another wire is being added. If no further wire is being added, a determination is made at block 918 if a via is being added. If no via is to be added at block 918, the process ends.

Figure 11A:
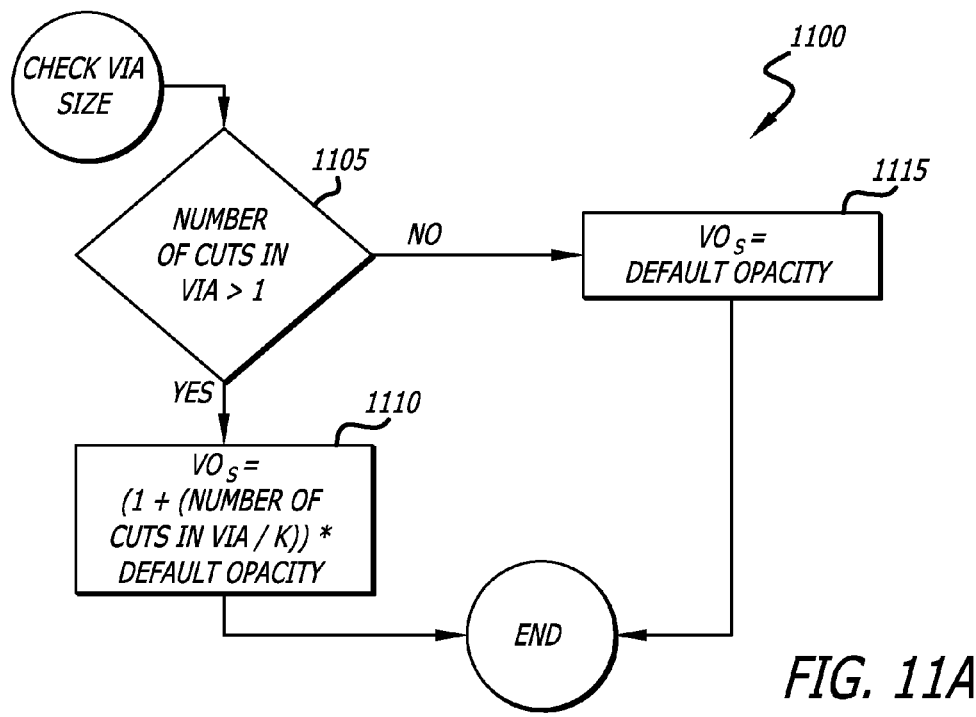
FIG. 11A is a flow chart describing the procedure Check_Via_Size in accordance with one embodiment of the invention.
Figure 11B:
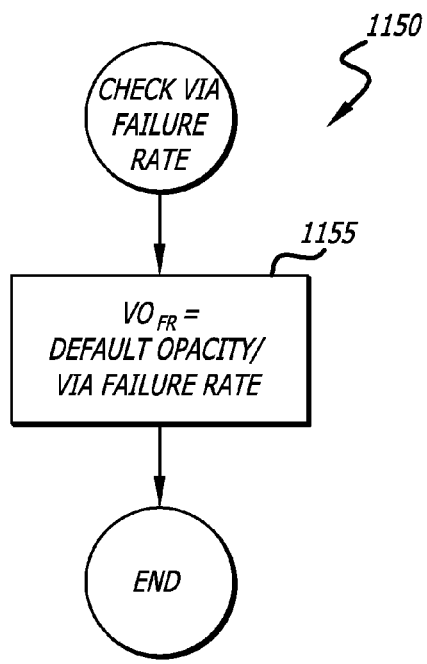
FIG. 11B is a flow chart describing the procedure Check_Via_Failure_Rate in accordance with one embodiment of the invention.

However, if a via has been added (see block 918), procedures Check_Via_Size and Check_Via_Failure_Rate are invoked in blocks 920 and 922 to compute the via opacity factor based on the size of the via (denoted $VO_S$) and the via opacity factor based on the failure rate of the via (denoted $VO_{FR}$) respectively. FIG. 11A is a flow chart 1100 describing the Check_Via_Size procedure in accordance with one embodiment of the invention. FIG. 11B is a flow chart 1150 describing the Check_Via_Failure_Rate procedure in accordance with one embodiment of the invention.

Referring now to FIG. 11A, if the number of cuts in the via is not greater than one (see block 1105), then the wire opacity factor for $VO_S$ is assigned the default opacity value (see block 1115). Otherwise, if the number of cuts in the via is greater than one (see block 1105), $VO_S$ is assigned an appropriate opacity value to reflect that multiple cuts in a via would result in a higher yield score for the via. In one embodiment, the opacity level assigned to $VO_S$ is determined from the equation (1+(Number of Cuts in the Via/K)), where K is a constant and the number of cuts in the via represents the number of vias in an array that are coupled to the same wires within a minimum via spacing of each other (see block 1115).

Referring now to FIG. 11B, the via opacity factor (denoted $VO_{FR}$) based on the statistical failure rate of a via, which may be supplied by a silicon foundry, is assigned an opacity level equal to the default opacity divided by the via failure rate for the given via (see block 1155) in one embodiment of the invention. In an alternative embodiment, various via failure rates are provided by the manufacturer based on factors such as the type of the via, the number of cuts in the via, the cut size of the opening of the via, and the metal enclosure or overlap of the via. Furthermore, the various via failure rates may be stored in a look up table and accessed based on the factors of the given via.

Returning to FIG. 9A, after via opacity factors $VO_S$ and $VO_{FR}$ are computed, these factors are weighted by being multiplied by constants $G_1$ and $G_2$ respectively, and the weighted opacity factors are added together (as shown in block 924) to determine the overall via opacity VO, representing the opacity of the added via that may be displayed by the user interface.

Figure 8:
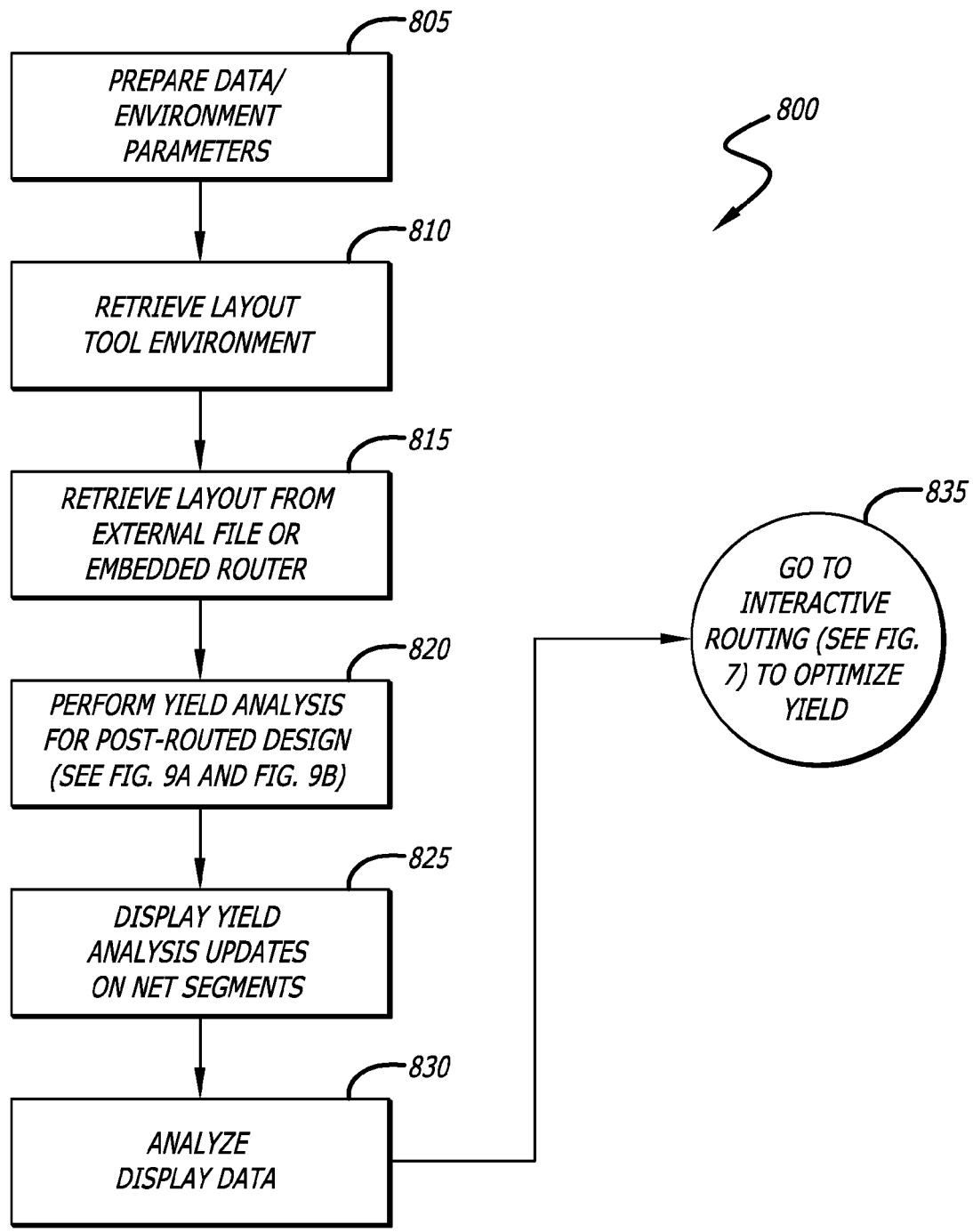
FIG. 8 is a flowchart describing the application of the yield analysis tool in a post-routing scenario in accordance with one embodiment of the invention.

As stated above, in one embodiment, the yield analysis tool can be applied on a post-routing basis as well as on an interactive routing basis. FIG. 8 is a flowchart 800 describing the application of the yield analysis tool in a post-routing scenario in accordance with one embodiment of the invention. In block 805, certain data or environment parameters, such as color setting and yield score rule definitions, are prepared.

Layout tool environment parameters are retrieved in block 810. The input layout design is retrieved from either an external file or an embedded router in block 815. The yield analysis of the layout is then performed on the input layout at block 820 with reference to FIG. 9A. At block 902 in FIG. 9A, if the yield analysis is not performed interactively, then the process goes to FIG. 9B.

Figure 9B:
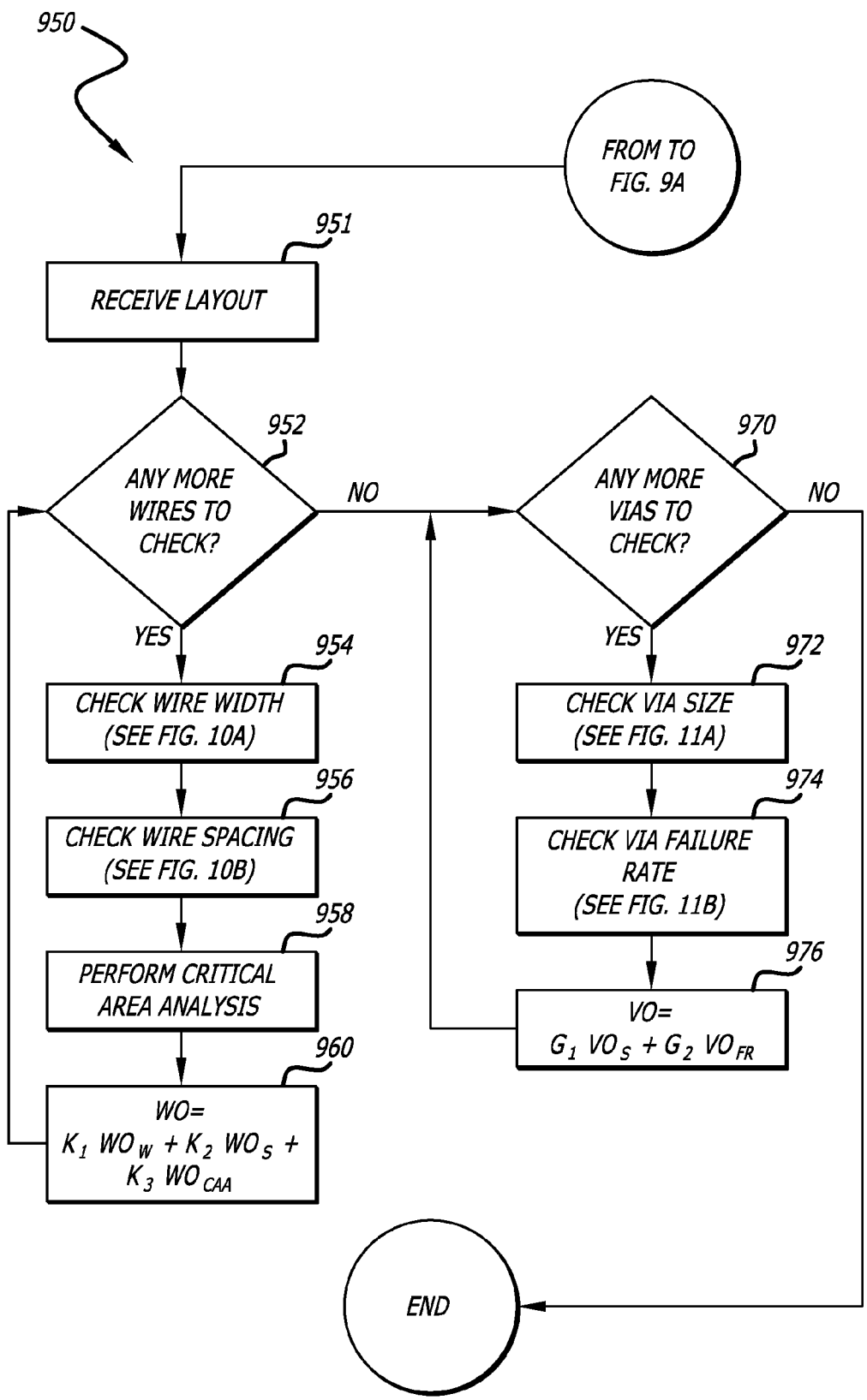
FIG. 9B is a flowchart describing the performance of yield analysis applied on a post-routing basis in accordance with one embodiment of the invention.

Referring now to FIG. 9B, a flowchart 950 illustrating the performance of yield analysis applied on a post-routing basis is shown in accordance with one embodiment of the invention. At block 951, the layout is received by the yield analysis tool. At block 952, a determination is made if there are any more wires to check. If so, for each wire in the layout, the procedures Check_Wire_Width and Check_Wire_Spacing are invoked to compute $WO_W$ and $WO_S$ respectively. These procedures are outlined in FIG. 10A and FIG. 10B and described above. In addition, the critical area analysis is performed and $WO_{CAA}$ is computed (see block 958). As stated above, in one embodiment the critical area analysis is generally a statistical analysis of wire yield based on manufacturing parameters. As shown in block 960, each of the wire opacity factors ($WO_W$, $WO_S$, and $WO_{CAA}$) are weighted by being multiplied by a constant ($K_1$, $K_2$, and $K_3$ respectively), and the weighted opacity factors are then summed together to determine the overall wire opacity (denoted WO) for each given wire.

As further shown in FIG. 9B, if there are no more wires to check for yield (see block 952), a determination is made if there are any more vias to check in the layout at block 970. If so, for each via in the layout (see block 970), Check_Via_Size and Check_Via_Failure_Rate procedures (see blocks 972 and 974) are invoked to compute $VO_S$ and $VO_{FR}$ respectively. These procedures are outlined in FIG. 11A and FIG. 11B and described above. As shown in block 976, each of the via opacity factors ($VO_S$ and $VO_{FR}$) may then be weighted by being multiplied by a constant ($G_1$ and $G_2$, respectively), and the weighted opacity factors may then be summed together to determine the overall via opacity (VO) for each given via.

Returning to FIG. 8, after the yield analysis is performed, the yield data updates are displayed (see block 825) on a monitor by the user interface. The designer may then analyze the layout with updated yield data (see block 830), and elect to interactively modify the layout to improve yield (see block 835).

While a weighted sum of opacity factors has been shown and described to determine the overall opacity levels for a wire or a via, instead, the overall wire or via opacity may be selected from look up tables with stored opacity levels using the separate opacity factors as indexes into the look up tables. Additionally, the yield analysis may be an object based yield analysis using the vias and wires as objects with an object oriented yield analysis tool.

Figure 12:
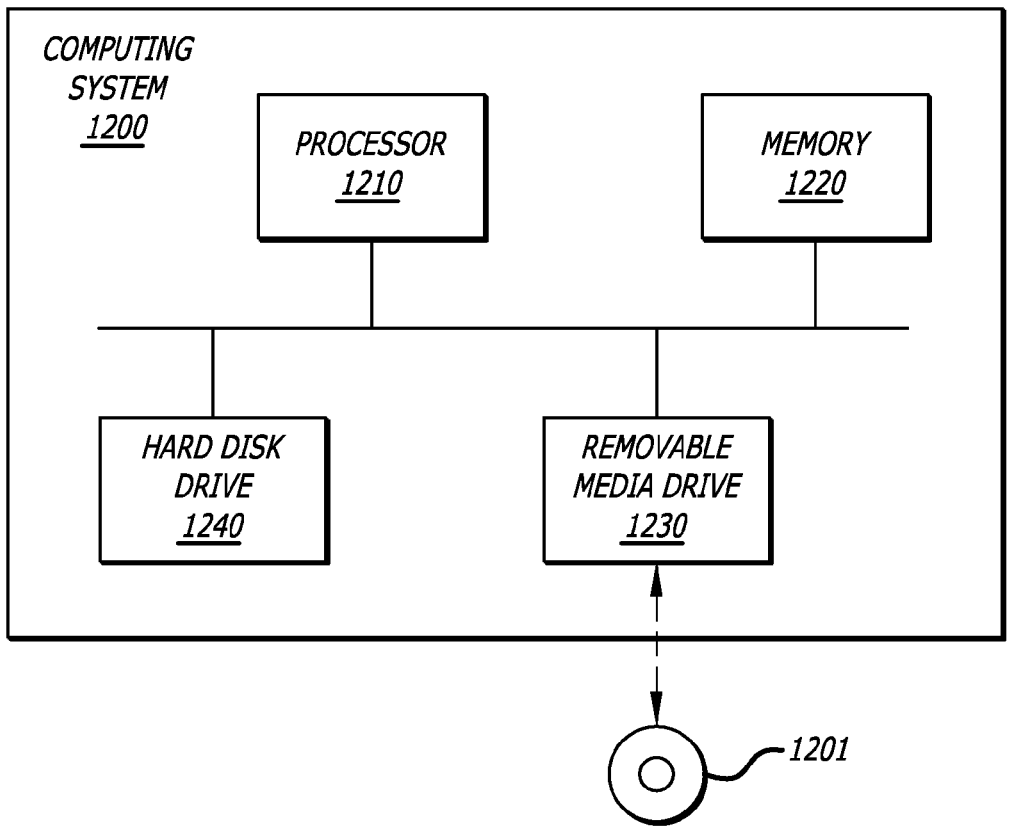
FIG. 12 illustrates an exemplary computing system that may be used to perform some or all of the processes in accordance with a number of embodiments of the invention.

Referring now to FIG. 12, a computing system 1200 is illustrated that may be used to perform some or all of the processes in accordance with a number of embodiments of the invention. In one embodiment of the invention, the computing system 1200 includes a processor 1210, a memory 1220, a removable media drive 1230, and a hard disk drive 1240. In one embodiment, the processor 1210 executes instructions residing on a machine-readable medium, such as the hard disk drive 1240, a removable medium (e.g., an optical medium (compact disk (CD), digital video disk (DVD), etc.), a magnetic medium (magnetic disk, a magnetic tape, etc.), or a combination of both. The instructions may be loaded from the machine-readable medium into the memory 1220, which may include Random Access Memory (RAM), dynamic RAM (DRAM), etc. The processor 1210 may retrieve the instructions from the memory 1220 and execute the instructions to perform the operations described above.

Note that any or all of the components and the associated hardware illustrated in FIG. 12 may be used in various embodiments of the system 1200. However, it should be appreciated that other configurations of the system 1200 may include more or less devices than those shown in FIG. 12.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the embodiments of the invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In addition, while the system and method to optimize a layout based on the yield analysis is disclosed by reference to the various embodiments and examples detailed above, it should be understood that these examples are intended in an illustrative rather than limiting sense, as it is contemplated that modifications will readily occur to those skilled in the art which are intended to fall within the scope of the embodiments of the invention. For example, the embodiments of the invention have been described with reference to metal wires and vias between the metal wires on a number of layers of an integrated circuit layout. However, the visual yield analysis can be extended to other layers to show yield in an integrated circuit design, such as polysilicon, diffusion, contact, and other layers of a layout used in an integrated circuit design. Rather, the embodiments of the invention should be construed by the claims that follow below.

What is claimed is:

1. A method for an integrated circuit layout, the method comprising:
   generating the integrated circuit layout including at least two layers of wire interconnect to form net segments and at least one via contact layer to couple net segments in the wire interconnect together;
   with a processor, performing a yield analysis of the net segments in the integrated circuit layout to form yield scores for the net segments in the integrated circuit layout, including checking a wire width of each net segment and checking a wire spacing of each net segment from other net segments; and
   displaying the net segments with a visual depiction of the yield analysis using multiple levels of opacity to reflect the yield scores of the net segments in the integrated circuit layout, including
      determining a first wire opacity for each net segment in response to the wire width check and a second wire opacity for each net segment in response to the wire spacing check,
      weighting the first wire opacity and the second wire opacity, and
      summing the weighted first wire opacity and the weighted second wire opacity together to generate a level of opacity for each net segment.

2. The method of claim 1, wherein
   the performance of the yield analysis of the net segments further includes
      performing a critical area analysis of each net segment; and
   the displaying of the net segments with a visual depiction further includes
      determining a third wire opacity for each net segment in response to the critical area analysis,
      weighting the third wire opacity, and
      summing the weighted first wire opacity, the weighted second wire opacity, and the weighted third wire opacity together to generate a level of opacity for each net segment.

3. The method of claim 1, wherein:
   the yield analysis of the net segments is concurrently performed for each interactively added wire in the integrated circuit layout; and
   the visual depiction of the yield analysis of the net segments is displayed interactively to reflect the yield analysis performed for each added wire.

4. The method of claim 1, wherein:
   the yield analysis of the net segments is concurrently performed for each interactively edited wire in the integrated circuit layout; and
   the visual depiction of the yield analysis of the net segments is displayed interactively to reflect the yield analysis performed for each edited wire.

5. The method of claim 1, wherein:
   the yield analysis is performed for each net segment in a post-routed layout; and
   the displaying of the net segments includes displaying the visual depiction of the yield analysis performed for each net segment of the post-routed layout.

6. The method of claim 1, wherein
   a net segment with a lower yield score has a lower level of opacity, and
   a net segment with a higher yield score has a higher level of opacity.

7. The method of claim 1, further comprising:
   performing a yield analysis of via contacts in the integrated circuit layout to form yield scores of the via contacts; and
   displaying the via contacts with a visual depiction of the yield analysis using multiple levels of opacity to reflect the yield scores of the via contacts in the integrated circuit layout.

8. The method of claim 7, wherein:
   the performance of the yield analysis of the via contacts includes
      checking a number of cuts of each via contact; and
   the displaying of the via contacts includes
      determining a first via opacity for each via contact in response to the number of cuts of the via contact.

9. The method of claim 8, wherein:
   the performance of the yield analysis of the via contacts further includes
      checking a via failure rate of each via contact; and
   the displaying of the via contacts further includes
      determining a second via opacity for each via contact in response to the via failure rate of the via contact,
      weighting the first via opacity and the second via opacity, and
      summing the weighted first via opacity and the weighted second via opacity to generate a level of opacity for the via contact.

10. A method for an integrated circuit layout, the method comprising:
    generating the integrated circuit layout including at least two layers of wire interconnect to form net segments and at least one via contact layer to couple net segments in the wire interconnect together;
    with a processor, performing a yield analysis of via contacts in the integrated circuit layout to form yield scores of the via contacts, including checking a number of cuts of each via contact and checking a via failure rate of each via contact; and
    displaying the via contacts with a visual depiction of the yield analysis using multiple levels of opacity to reflect the yield scores of the via contacts in the integrated circuit layout, including
       determining a first via opacity for each via contact in response to the number of cuts of the via contact,
       determining a second via opacity for each via contact in response to the via failure rate of the via contact, weighting the first via opacity and the second via opacity, and summing the weighted first via opacity and the weighted second via opacity to generate a level of opacity for the via contact.

11. The method of claim 10, wherein:
the yield analysis of via contacts is concurrently performed for each interactively added via contact in the integrated circuit layout; and
the visual depiction of the yield analysis of the via contacts is displayed interactively to reflect the yield analysis performed for each added via contact.

12. The method of claim 10, wherein:
the yield analysis of via contacts is concurrently performed for each interactively edited via contact in the integrated circuit layout; and
the visual depiction of the yield analysis of the via contacts is displayed interactively to reflect the yield analysis performed for each edited via contact.

13. A system for analyzing an integrated circuit layout, the system comprising:
instructions of one or more software modules stored in a storage device and executable by a processor, the one or more software modules including instructions for
a layout software module to generate the integrated circuit layout including at least two layers of wire interconnect to form net segments and at least one via contact layer to couple net segments in the wire interconnect together;
a layout yield analyzer to perform a yield analysis of the net segments in the integrated circuit layout to form yield scores for the net segments in the integrated circuit layout including
checking a wire width of each net segment and checking a wire spacing of each net segment from other net segments to perform a yield analysis of the net segments,
determining a first wire opacity for each net segment in response to the wire width check,
determining a second wire opacity for each net segment in response to the wire spacing check,
weighting the first wire opacity and the second wire opacity, and
summing the weighted first wire opacity and the weighted second wire opacity together to generate a level of opacity for each net segment;
and
a user interface operatively coupled to the layout yield analyzer, the user interface to display the net segments with a visual depiction of the yield analysis using multiple levels of opacity to reflect the yield scores of the net segments in the integrated circuit layout.

14. The system of claim 13, wherein
the layout software module includes instructions of a layout editor to interactively generate the integrated circuit layout.

15. The system of claim 13, wherein
the layout software module includes instructions of a placer and a router to place and route the integrated circuit layout prior to a yield analysis of the integrated circuit layout.

16. The system of claim 13, wherein:
the layout yield analyzer further to perform a critical area analysis of each net segment; and
the user interface further to
determine a third wire opacity for each net segment in response to the critical area analysis,
weight the third wire opacity, and
sum the weighted first wire opacity, the weighted second wire opacity, and the weighted third wire opacity together to generate a level of opacity for each net segment to display the net segments with a visual depiction of the yield analysis.

17. The system of claim 13, wherein
a net segment with a lower yield score has a lower level of opacity, and
a net segment with a higher yield score has a higher level of opacity.

18. The system of claim 13, wherein:
the layout yield analyzer further to perform a yield analysis of via contacts in the integrated circuit layout to form yield scores of the via contacts; and
the user interface further to display the via contacts with a visual depiction of the yield analysis using multiple levels of opacity to reflect the yield scores of the via contacts in the integrated circuit layout.

19. The system of claim 18, wherein:
the layout yield analyzer further to
check a number of cuts and a failure rate of each via contact to perform a yield analysis of the via contacts,
determine a first via opacity and a second via opacity for each via contact in response to the check of the number of cuts and the failure rate of the via contact respectively,
weight the first via opacity and the second via opacity, and
sum the weighted first via opacity and the weighted second via opacity to generate a level of opacity for the via contact to display a visual depiction of the yield analysis of the via contacts.

20. A system for analyzing an integrated circuit layout, the system comprising:
instructions of one or more software modules stored in a storage device and executable by a processor, the one or more software modules including instructions for
a layout software module to generate the integrated circuit layout including at least two layers of wire interconnect to form net segments and at least one via contact layer to couple net segments in the wire interconnect together;
a layout yield analyzer to perform a yield analysis of via contacts in the integrated circuit layout to form yield scores of the via contacts in the integrated circuit layout including
checking a number of cuts and a failure rate of each via contact to perform a yield analysis of the via contacts;
determining a first via opacity and a second via opacity for each via contact in response to the check of the number of cuts and the failure rate of the via contact respectively,
weighting the first via opacity and the second via opacity, and
summing the weighted first via opacity and the weighted second via opacity to generate a level of opacity for the via contact to display a visual depiction of the yield analysis of the via contacts;
and
a user interface operatively coupled to the layout yield analyzer, the user interface to display the via contacts with a visual depiction of the yield analysis using multiple levels of opacity to reflect the yield scores of the via contacts in the integrated circuit layout.

21. A machine-readable storage device having instructions stored therein which, when executed by a machine, cause the machine to perform operations comprising:
- receiving an integrated circuit layout including at least two layers of wire interconnect to form net segments and at least one via contact layer to couple net segments in the wire interconnect together;
- performing a yield analysis of the net segments in the integrated circuit layout to form yield scores for the net segments in the integrated circuit layout including checking a wire width of each net segment and checking a wire spacing of each net segment from other net segments; and
- displaying the net segments with a visual depiction of the yield analysis using multiple levels of opacity to reflect the yield scores of the net segments in the integrated circuit layout including
    - determining a first wire opacity for each net segment in response to the wire width check and a second wire opacity for each net segment in response to the wire spacing check,
    - weighting the first wire opacity and the second wire opacity, and
    - summing the weighted first wire opacity and the weighted second wire opacity together to generate a level of opacity for each net segment.

22. The machine-readable storage device of claim 21, wherein
- a net segment with a lower yield score has a lower level of opacity, and
- a net segment with a higher yield score has a higher level of opacity.

23. The machine-readable storage device of claim 21, further having instructions stored therein which, when executed by a machine, cause the machine to perform the additional operations of:
- performing a yield analysis of via contacts in the integrated circuit layout to form yield scores of the via contacts; and
- displaying the via contacts with a visual depiction of the yield analysis using multiple levels of opacity to reflect the yield scores of the via contacts in the integrated circuit layout.

24. The machine-readable storage device of claim 23, wherein:
- the performing of the yield analysis of the via contacts includes
    - checking a number of cuts of each via contact; and
- the displaying of the via contacts includes
    - determining a first via opacity for each via contact in response to the number of cuts of the via contact.

25. The machine-readable storage device of claim 24, wherein:
- the performing of the yield analysis of the via contacts further includes
    - checking a via failure rate of each via contact; and
- the displaying of the via contacts further includes
    - determining a second via opacity for each via contact in response to the via failure rate of the via contact,
    - weighting the first via opacity and the second via opacity, and
    - summing the weighted first via opacity and the weighted second via opacity to generate a level of opacity for the via contact.

26. A machine-readable storage device having instructions stored therein which, when executed by a machine, cause the machine to perform the additional operations of:
- receiving an integrated circuit layout including at least two layers of wire interconnect to form net segments and at least one via contact layer to couple net segments in the wire interconnect together;
- performing a yield analysis of via contacts in the integrated circuit layout to form yield scores of the via contacts, including checking a number of cuts of each via contact and checking a via failure rate of each via contact; and
- displaying the via contacts with a visual depiction of the yield analysis using multiple levels of opacity to reflect the yield scores of the via contacts in the integrated circuit layout including
    - determining a first via opacity for each via contact in response to the number of cuts of the via contact,
    - determining a second via opacity for each via contact in response to the via failure rate of the via contact,
    - weighting the first via opacity and the second via opacity, and
    - summing the weighted first via opacity and the weighted second via opacity to generate a level of opacity for the via contact.

27. A method for an integrated circuit layout, the method comprising:
- reading an integrated circuit layout including net segments formed of at least two layers of wire interconnect coupled together by at least one via contact layer;
- with a processor, performing a yield analysis of the net segments and via contacts in the integrated circuit layout to generate yield scores of the net segments and via contacts, including
    - checking a wire width of each net segment,
    - checking a wire spacing of each net segment from other net segments,
    - determining a first wire opacity for each net segment in response to the wire width check and a second wire opacity for each net segment in response to the wire spacing check,
    - weighting the first wire opacity and the second wire opacity, and
    - summing the weighted first wire opacity and the weighted second wire opacity together to generate a level of opacity for each net segment;
and
- displaying the integrated circuit layout with the net segments and via contacts having multiple levels of opacity to show the yield scores of the net segments and via contacts in the integrated circuit layout.

28. The method of claim 27, wherein
- a net segment with a lower yield score has a lower level of opacity,
- a via contact with a lower yield score has a lower level of opacity,
- a net segment with a higher yield score has a higher level of opacity; and
- a via contact with a higher yield score has a higher level of opacity.

29. The method of claim 27, wherein
- the displaying of the integrated circuit layout is with a display device.

30. The method of claim 27, wherein
- the performing of the yield analysis of the via contacts includes
    - checking a number of cuts of each via contact;

determining a first via opacity for each via contact in response to the number of cuts of the via contact.

31. The method of claim 30, wherein
the performing of the yield analysis of the via contacts further includes
checking a via failure rate of each via contact;
determining a second via opacity for each via contact in response to the via failure rate of the via contact,
weighting the first via opacity and the second via opacity, and
summing the weighted first via opacity and the weighted second via opacity to generate a level of opacity for the via contact.

32. The method of claim 27, wherein
the performing of the yield analysis of the net segments further includes
performing a critical area analysis of each net segment;
determining a third wire opacity for each net segment in response to the critical area analysis,
weighting the third wire opacity, and
summing the weighted first wire opacity, the weighted second wire opacity, and the weighted third wire opacity together to generate a level of opacity for each net segment.

\* \* \* \* \*